Figure 2:
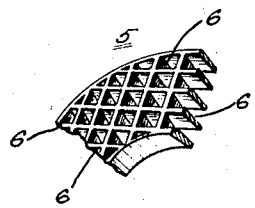

Jan. 13, 1959 V. VOLCOV ET AL 2,868,492
AUTOMATIC QUIET DISCHARGE VALVE
Filed Jan. 25, 1954

INVENTORS:
Vittorio Volcov
Nicolas Baranoff
BY Singer, Stern & Carlberg
Attorneys.

United States Patent Office 2,868,492
Patented Jan. 13, 1959

2,868,492
AUTOMATIC QUIET DISCHARGE VALVE

Vittorio Volcov and Nicolas Baranoff, Buenos Aires, Argentina; said Volcov assignor to said Baranoff Application January 25, 1954, Serial No. 405,677

2 Claims. (Cl. 251—46)

The present invention refers to an improved automatic valve for liquids, especially for use with water closets, that does not suffer from the hydraulic knock and that displays several other advantages over known automatic valves of this type, as will appear below in this specification.

Automatic valves, as now known and sold, are of two distinct classes, those suitable for high pressures and those that operate satisfactorily at low pressures, these two classes not being interchangeable, as the high pressure valve is necessary for the heavy duty imposed upon it, whilst the low pressure valve is necessary for pressures that are insufficient to make the former operate at all.

The value of this invention lies in the fact that one embodiment of the valve here described operates perfectly at all pressures between 0.15 and 7 atmospheres pressures, i. e. pressures usually found in urban sanitary installations.

The knock that is almost universally produced upon closing the common automatic valve hitherto in use is not only a nuisance, but is apt to be so severe that many municipalities forbid the use of lead piping with automatic valves, owing to the danger of rupture due to the repeated knock of the suddenly arrested column of water.

Recognized authorities on the subject of hydraulics have frequently pointed out the necessity for some sort of damper to eliminate the blow caused by the sudden closure of any kind of water discharge, but no practical solution of this problem has been developed in valves of the kind under review that are the subject of this invention.

The improved valve eliminates all known imperfections hitherto displayed, i. e., it is equally reliable and satisfactory at all normal pressures, it eliminates the dangerous knock on closing and, as it is streamlined, it operates practically noiselessly, owing to the reduction of turbulence in the discharge.

The principal novelty of the present invention consists in the provision of a damping chamber within the valve, which absorbs the pressure wave formed upon closure and thereby eliminates the water-hammer.

Another important quality of this valve is the simplicity and streamlined shape of the interior which assures perfect operation.

Yet another important improvement is the fact that this valve is, for practical purposes, universal in its application and that the uniform discharge is practically silent. The abovementioned improvements, as well as others that will become evident below, make this valve suitable and perfectly safe for use with ordinary lead piping.

For the sake of clarity and easy comprehension a sheet of drawings is attached hereto illustrating two preferred embodiments of the present invention but without restricting same to the drawings shown.

Figure 1:
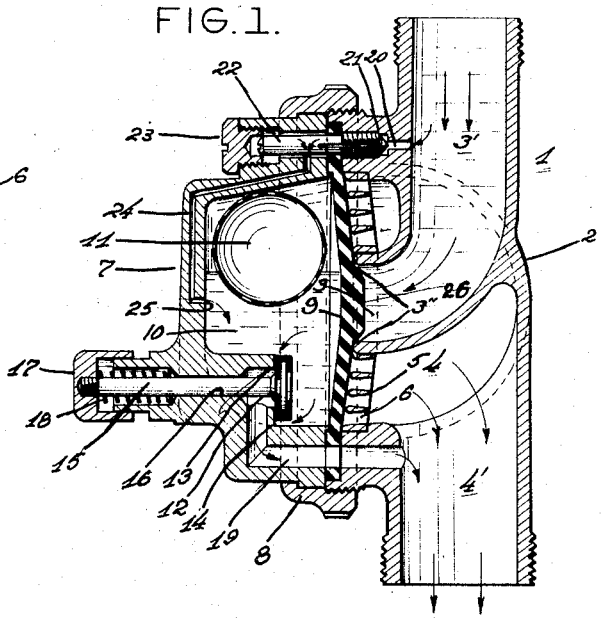
Figure 3:
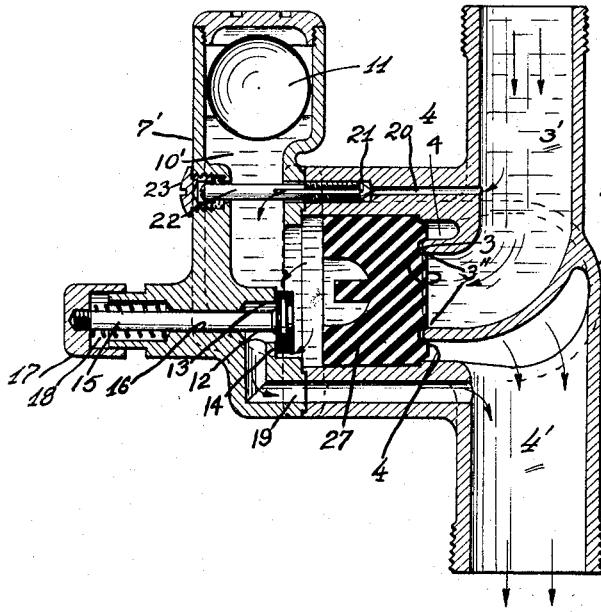
Figure 4:
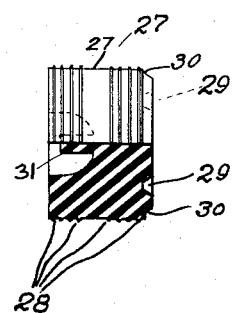

In the attached drawings Fig. 1 shows a vertical section through the new valve. Fig. 2 is a view in perspective of a portion of the grid upon which the diaphragm closes and which tends to streamline the liquid column. Fig. 3 is a vertical section of a modified embodiment of the valve and Fig. 4 is a portion, partly in section of the piston belonging to the embodiment shown in Fig. 3.

Referring to the drawings: the valve 1, has a body 2, with an opening entry 3, and a discharge opening 4, said openings being concentric, but having different diameters.

An annular member 5, having a plurality of openings 6, covers the annular edges of the outlet 4, leaving the mouth of the inlet 3 free.

The openings 6, in the annular member 5, have smaller dimensions of entry than those of exit, thereby practically forming a set of short venturi tubes.

A cover 7 is mounted upon body 2 and is attached to same by means of a screw unit 8, thereby holding the diahpragm 9 against the outer edge of the discharge opening 4, which the elastic diaphragm 9 is adapted to close. The cover 7 and the diaphragm 9 define a damping chamber 10, which chamber 10 contains an elastic body 11 hermetically sealed and filled with air, such as a rubber ball.

The cover 7 has an intermediate chamber 12 adapted to hold the valve controlling means. This intermediate chamber 12 is closed by a plug 13 covered by a rubber ring 14. A stem 15, integral with the plug 13, is axially slidable in a passage 16 in the cover 7, and extends outside cover 7 to end in button 17.

A helical spring 18, which exerts pressure against the button 17, retains the plug 13 in watertight closure of the intermediate chamber 12.

A channel 19 formed in the cover 7 connects the said intermediate chamber 12 with the outlet 4'.

The inlet 3' is in communication with the damping chamber 10 through the channel 20, the available flow section of which is regulated by the cone 21 of a discharge regulating valve 22 having a screw thread whereby it is fitted into the body 2 of the valve 1 and a screw head in an opening of the cover 7 where a screwed hollow cap 23 is provided to enclose said regulating valve 22.

A further channel 24 in the cover 7 unites the above mentioned channel 20 with the chamber 10 and the outlet 25 of said channel 24 is preferably at a point adjacent the lower portion of the chamber 10, so as to be submerged when the valve 1 is in normally closed position.

Fig. 1 shows the valve 1 in closed position and clearly discloses the truncated cone extension 26 of the diaphragm 9 closing the mouth of the entry 3. The operation of the valve can be clearly understood from Fig. 1 in which position it can be seen that, upon pressing the button 17, the pressure in the chamber 10 will be released by the movement of the plug 13 and the discharge of liquid from the chamber 10 through the intermediate chamber 12 and the channel 19 to the discharge pipe 4'. The lowering of the pressure in the chamber 10 causes the straightening out of the elastic diaphragm 9 and the opening of the entry 3. The liquid then enters the space formed by the recession of the diaphragm 9 and discharges through the openings 6 of the annular member or grid 5 forming a uniform stream that discharges into the outlet pipe 4'. Upon releasing the pressure on the button 17 the spring 18 immediately acts upon the plug 13 and closes the entry to the intermediate chamber 12 and the liquid entering the intermediate chamber 12 from the entry pipe 3' through the channel 20 regulated by the valve 21 and then passing through the channel 24 now begins to fill the chamber 10.

The rising level of the liquid in the chamber 10 causes a rapid compression of the air contained in the said chamber 10 containing the elastic body 11 until this pressure rises to a degree sufficient to press the diaphragm 9 towards its seat 3'' and, at the instant of closure, the diaphragm 9 sustains a dynamic blow that drives it back, thereby compressing the air contained in the chamber 10 and in the elastic body 11. This cushion of air absorbs the dynamic shock, often called water hammer and, acting as a spring or damper, causes the diaphragm to move forward again to its seat 3'', thereby producing another dynamic blow of lesser intensity than that of the former. A series of regularly diminishing blows are thus absorbed by the air cushion in the chamber 10 without transmitting the pressure waves formed to the entry pipe 3' or to the column of water standing in same, until, after the last almost imperceptible blow, the entry 3 is sealed by the diaphragm 9. The complete absorption of the dynamic blows is due to the fact that the pressure wave of the liquid is straight and directly into the damping chamber 10.

As regards the discharge, the annular member or grid 5 serves to support the diaphragm 9 and thereby enables the said diaphragm 9 to withstand considerable pressure, whilst it also eliminates the turbulence of the flowing liquid by dividing this into a large number of uniform streamlets. It is well known that when a liquid having a given velocity, passes through a grid, it loses a portion of its velocity and its force is spread uniformly over the whole surface of same.

This loss of velocity is largely compensated in the valve of this invention by the formation of the openings 6 in the annular member or grid 5, as already described, which act as small venturi tubes and thereby increase the velocity of the liquid.

The embodiment of this invention as above described is perfectly satisfactory for use with pressures up to seven atmospheres and will operate perfectly when only six feet below the water tank that supplies it, but, in special cases where the pressures exceeds seven atmospheres, there is a possible danger of damaging the diaphragm 9.

For these special cases a modified embodiment of this invention has been devised, as illustrated in Fig. 3, wherein the combination of grid 5 and diaphragm 9 is replaced by a rubber piston 27 of soft resilient rubber having a special shape. This rubber piston 27 is basically shaped in the form of a cylinder provided with a plurality of rings 28 parallel to its ends, so that the piston 27 slides in the surrounding wall, making contact only by means of the said rings 28 and not by means of its body, thereby diminishing the friction of movement and, at the same time securing a water-tight joint between the separate portions of the valve 1.

The rear surface of the piston 27 has a ring shaped groove 29 corresponding to the mouth 3'' of the entry pipe 3'.

Another groove, also of annular shape 30, concentric with the former groove 29, is provided around the rear edge of the piston 27 and corresponds with a shoulder forming a reduction in the diameter of the main portion of the chamber or cylinder within which the piston 27 operates.

The front surface or face of the piston 27 may be flat, or may have an annular recess 31, as shown in Figs. 3 and 4, for easy gripping of the piston 27 when fitting or removing same.

This embodiment has a further modification of detail in that the cover 7' is of a different shape from that of the embodiment shown in Fig. 1, so that the damping chamber 10 is at a higher level than the channel 20 which connects the entry pipe 3' with the chamber 10'. This eliminates the necessity for a channel 24 of Figure 1 in the cover 7' as the level of the channel 20 is now sufficiently low in the chamber 10'.

The operation of this embodiment of the present invention is almost identical with that already described above, with the sole exception that the closure member, which is represented in this case by the piston 27, presses directly against the edges of the openings of entry 3'' and discharge 4' whilst the diaphragm 9 in the former embodiment is adapted to press against the entry 3' and the grid 5.

What we claim is:

1. An automatic valve for the quiet discharge of liquids, free from water hammer, characterized in that it comprises a metal casing forming a valve body having a removable cover and containing a damping air chamber and concentric intake and discharge pipes forming openings of entry and discharge; an intermediate chamber formed in the removable cover of the said casing, a sliding plug adapted to close said intermediate chamber, said intermediate chamber connecting the said damping air chamber directly with the discharge pipe; a controlled by-pass channel in said casing and cover for passing the liquid from the intake pipe to the damping chamber; a valve in said channel to control the passage of fluid to said damping chamber, a spherical elastic water tight member filled with air in said damping chamber for retaining a minimum amount of air in same, and elastic closure means for sealing the openings of entry and of discharge, the rear face whereof has an extension adapted to close said opening of entry, said elastic closure means of the entry and discharge openings consisting of a piston of resilient rubber of cylindrical shape, with a plurality of rings upon its circumference, parallel with the bases of said cylindrical piston, the rear base whereof has a circular groove corresponding to the edge of the entry pipe and another circular groove, concentric with the former and situated at the outer periphery of said rear base of said piston, corresponding to an interior shoulder within the body of the valve, whilst the front base of the said cylindrically shaped piston has a recess suitably formed to serve as holding means when fitting and dismounting the said piston.

2. An automatic valve for the quiet discharge of liquid, free from water hammer, comprising in combination a metal body having a removable cover forming a valve casing having a damping chamber formed in the removable cover containing elastic water-tight means for retaining a minimum amount of air in same, concentric inlet and discharge pipes forming openings of entry and discharge, elastic closure means for simultaneously sealing off both the entry and discharge, an intermediate chamber having communication with the damping chamber and a duct connecting the damping chamber directly with the discharge pipe, a valve plug in said intermediate chamber for controlling the passage of fluid therethrough, a by-pass channel connecting the entry pipe with the damping chamber, and a valve in said by-pass channel to control the passage of fluid to said damping chamber, said channel having a discharge opening in said damping chamber at a lower point than that of the liquid normally present in said chamber, and said inlet and discharge pipes being arranged such that the inlet pipe is encircled by the discharge pipe, said elastic closure means of the entry and discharge openings consisting of a piston of resilient rubber of cylindrical shape, said piston having a plurality of rings upon its circumference parallel with the bases of said piston, the rear base of said piston being provided with a circular groove corresponding to the edge of the entry pipe, and another circular groove in the base of said piston concentric with the first mentioned groove and situated at the outer periphery of said rear base of said piston corresponding to an interior shoulder within the body of the valve, and the front base of said cylindrically shaped piston being provided with a recess having a handle projection adapted to serve as a holding means to facilitate fitting and dismounting said piston.

References Cited in the file of this patent

UNITED STATES PATENTS

| | | |
|---|---|---|
| 269,886 | Semple | Jan. 2, 1883 |
| 1,221,702 | Douglas | Apr. 3, 1917 |
| 1,269,721 | Kuntny | June 18, 1918 |
| 1,621,910 | Thompson | Mar. 22, 1927 |
| 2,211,237 | Langdon | Aug. 13, 1940 |
| 2,212,284 | Wolff | Aug. 20, 1940 |
| 2,327,545 | Oravec | Aug. 24, 1943 |
| 2,497,020 | Singer | Feb. 7, 1950 |